March 14, 1933. H. ROGATZ 1,901,567
APPARATUS FOR SURVEYING DRILL HOLES
Filed Oct. 17, 1929 6 Sheets-Sheet 1
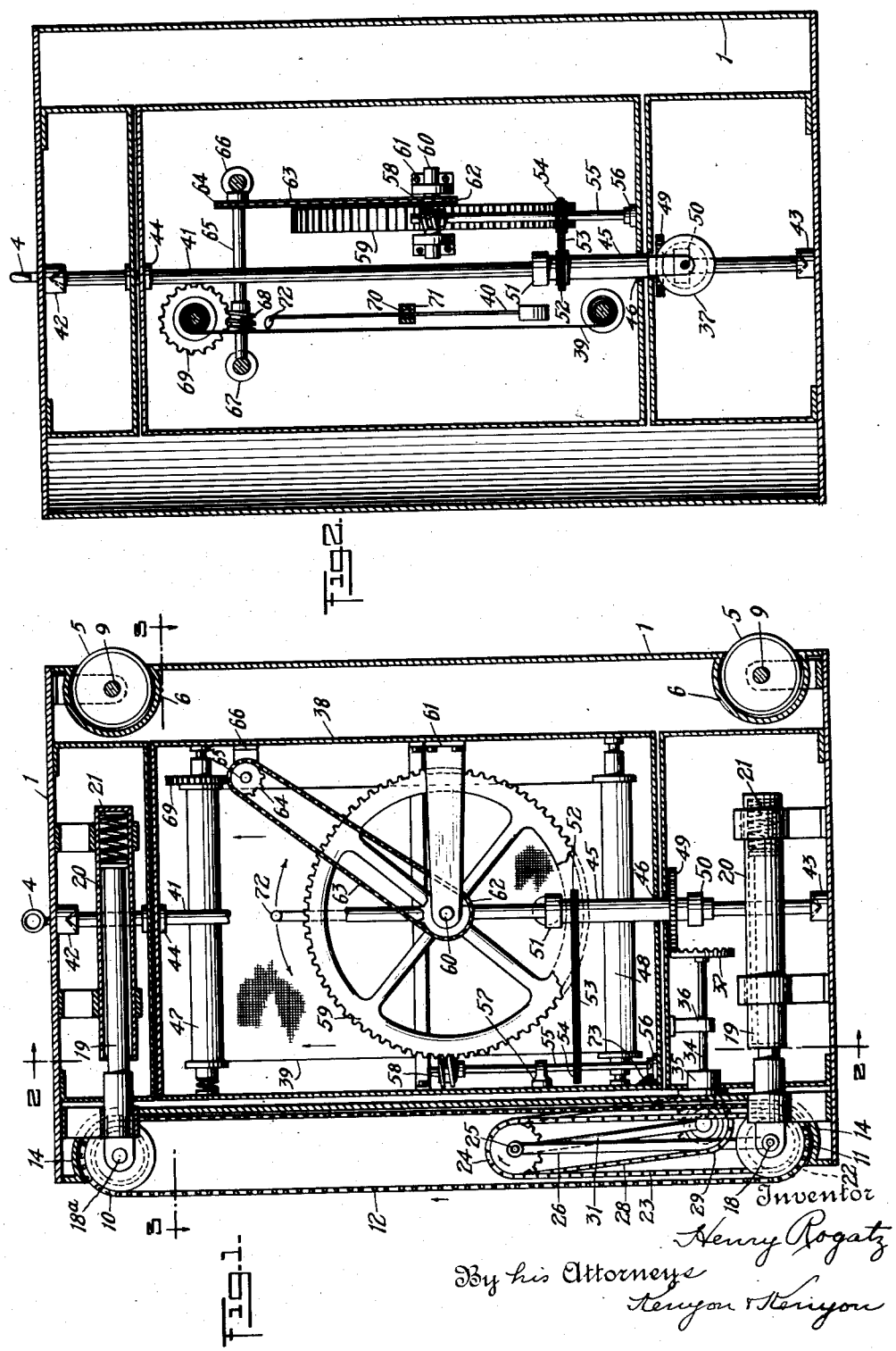

March 14, 1933.   H. ROGATZ   1,901,567
APPARATUS FOR SURVEYING DRILL HOLES
Filed Oct. 17, 1929   6 Sheets-Sheet 2
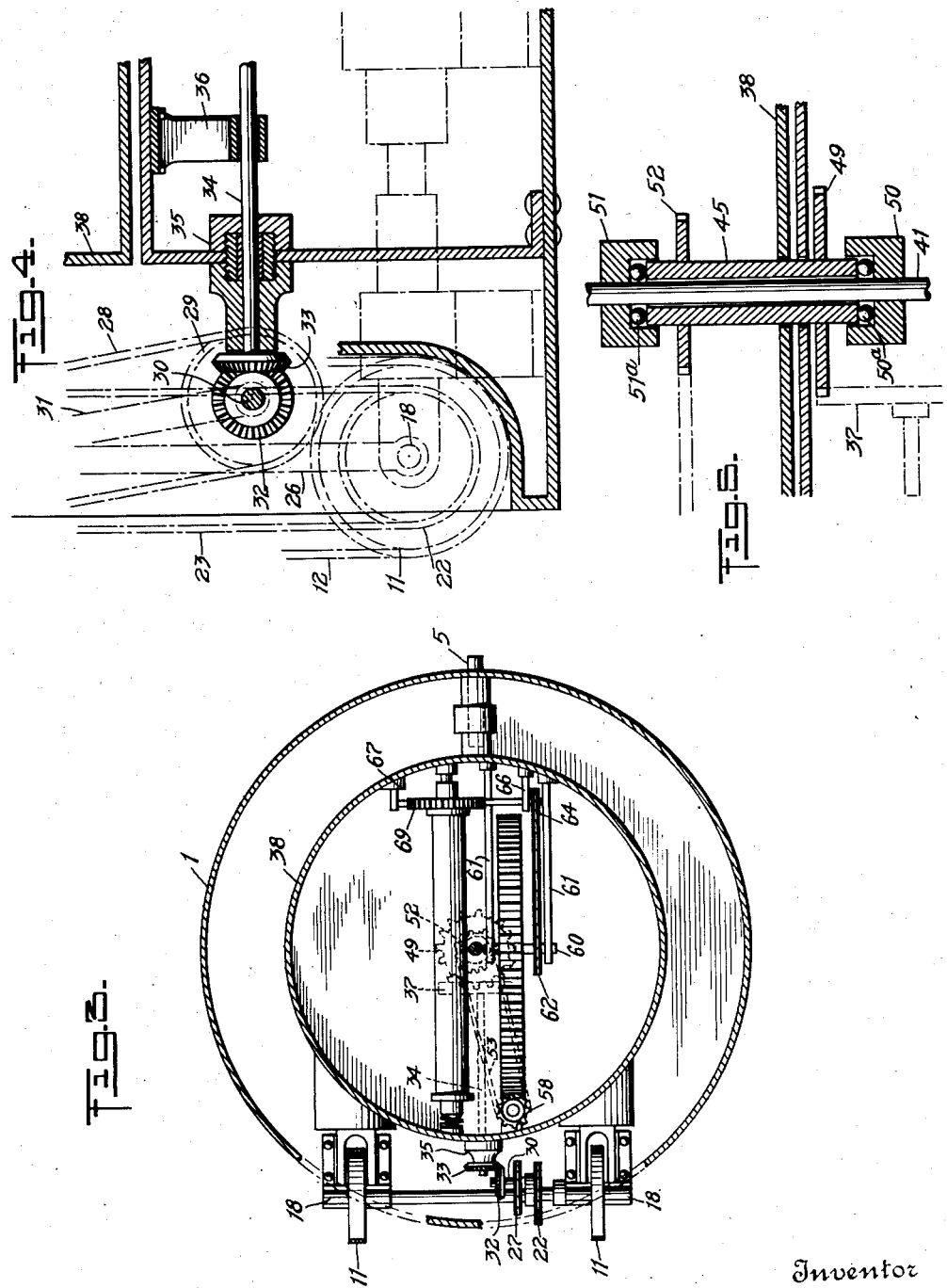

March 14, 1933.  H. ROGATZ  1,901,567
APPARATUS FOR SURVEYING DRILL HOLES
Filed Oct. 17, 1929   6 Sheets-Sheet 3
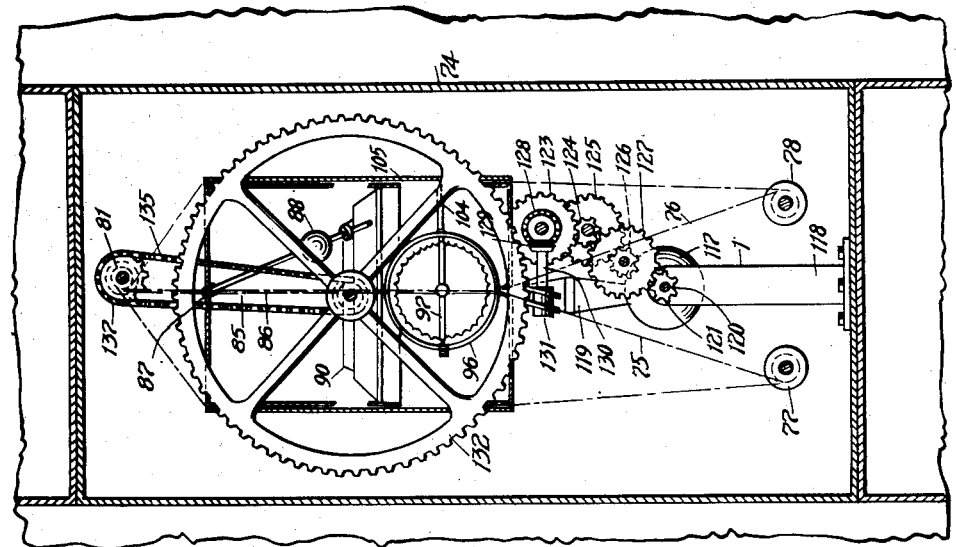

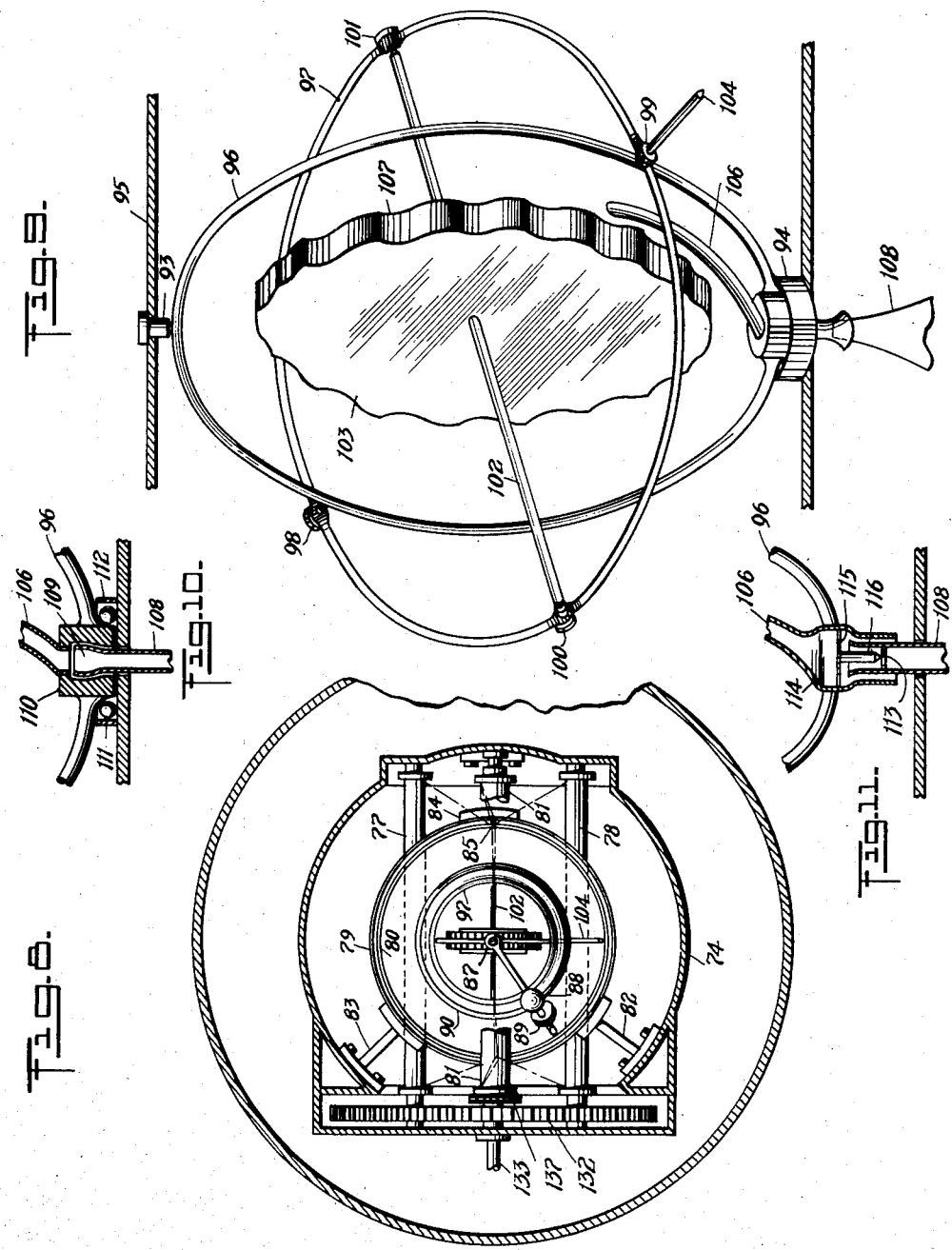

March 14, 1933.  H. ROGATZ  1,901,567
APPARATUS FOR SURVEYING DRILL HOLES
Filed Oct. 17, 1929    6 Sheets-Sheet 5
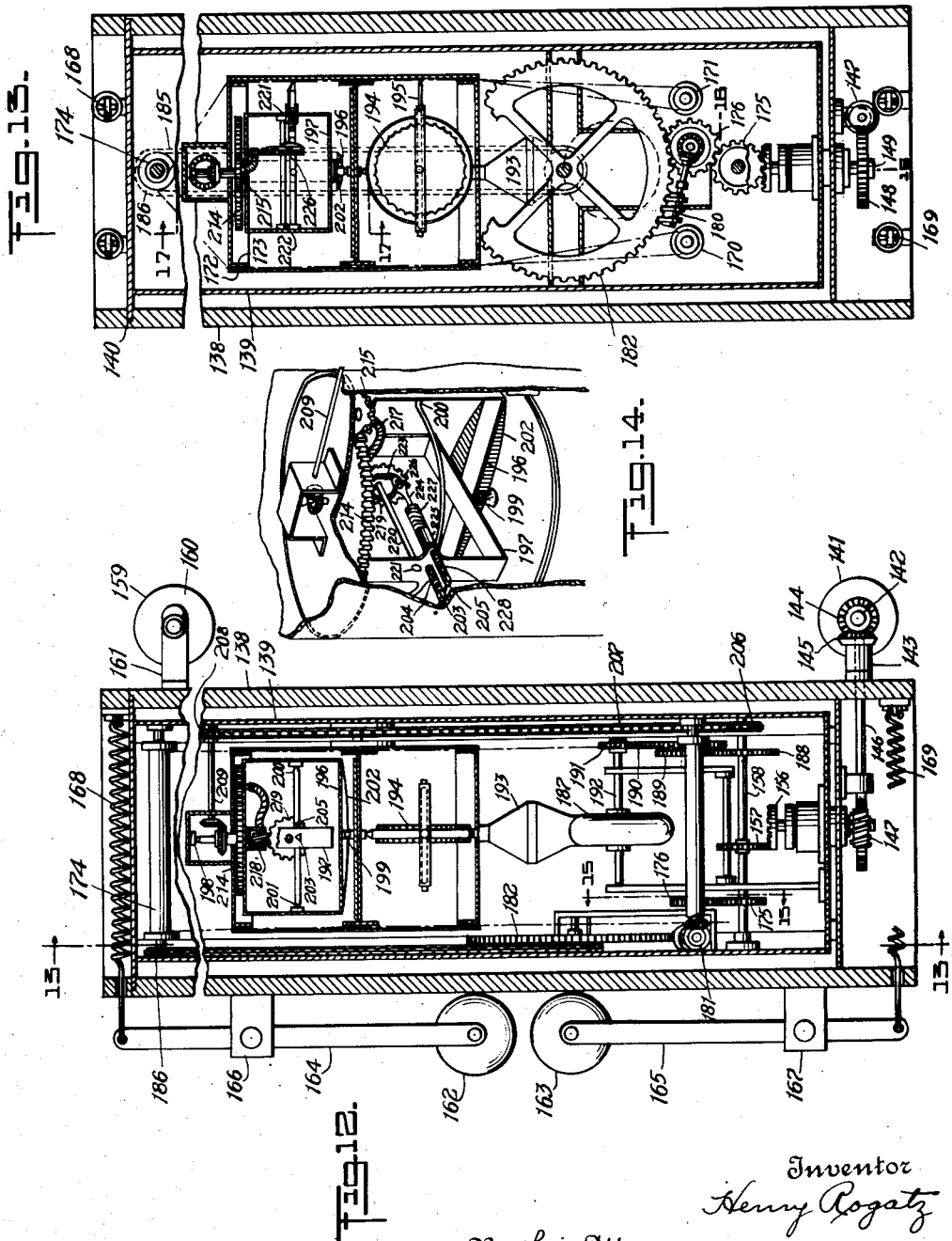
Inventor
Henry Rogatz
By his Attorneys
Kenyon & Kenyon March 14, 1933. H. ROGATZ 1,901,567
APPARATUS FOR SURVEYING DRILL HOLES
Filed Oct. 17, 1929 6 Sheets-Sheet 6
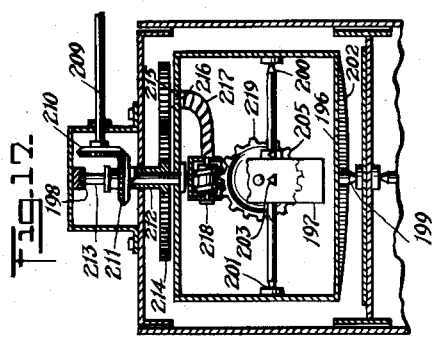
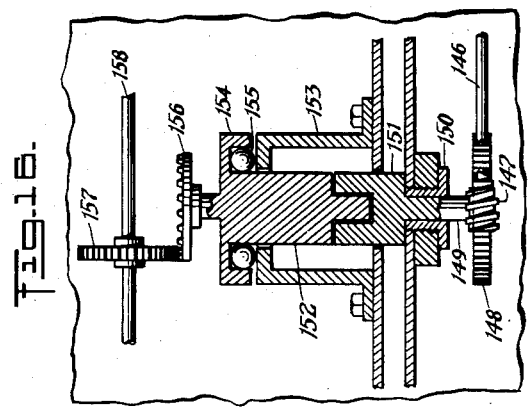
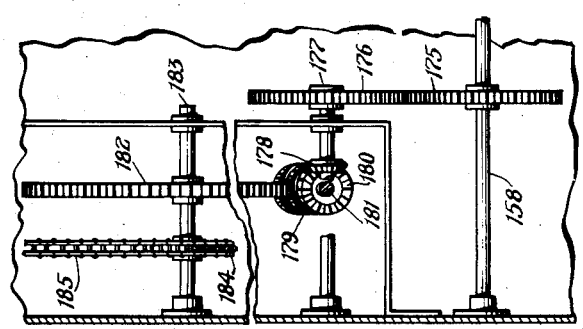
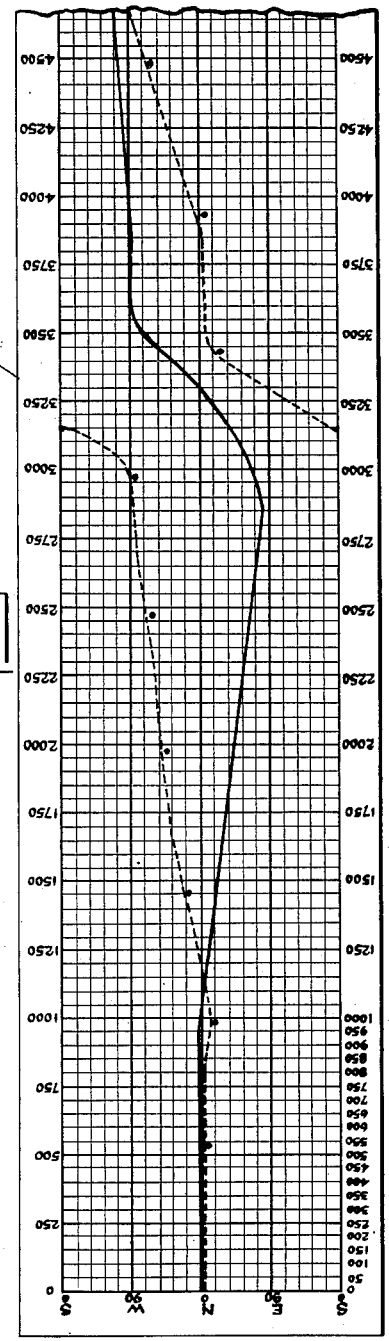
Inventor
Henry Rogatz
By his Attorneys
Kenyon & Kenyon Patented Mar. 14, 1933

1,901,567

UNITED STATES PATENT OFFICE

HENRY ROGATZ, OF AMARILLO, TEXAS

APPARATUS FOR SURVEYING DRILL HOLES

Application filed October 17, 1929. Serial No. 400,202.

This invention relates to surveying instruments and relates particularly to apparatus for surveying drill holes such as those made for oil and gas wells.

A purpose of the invention is to accurately survey the courses of drill holes in order to find their true vertical and horizontal orientation and true depth by simple, efficient and accurate means, and by means which will be unaffected by the pressures or temperatures encountered in operation.

In the making of drill holes such as made for oil and gas wells, it is substantially impossible to drill into the earth for considerable distance without deviating from a straight line and if, for example, effort is made to drill vertically into the earth for three thousand feet, it will be found in substantially all cases that the path of the drill in descending into the earth has deviated from the true vertical in varying amounts both as to direction and degree. Drill holes as commonly made are frequently very crooked and at a depth of three or four thousand feet may have deviated two to three hundred feet from the true vertical. It is of great advantage to know the true path of such drill holes so that penetration into adjacent property may be detected and prevented, so that sub-surface locations may be made accurately and so that accurate sub-surface geological maps may be made. Furthermore since it is difficult and sometimes almost impossible to produce oil from wells which deviate too greatly from the vertical—especially where pumping is necessary—it is absolutely essential to test the wells for straightness at equal intervals of depth to assure the straight drilling of the hole. Where the survey shows a deviation over a certain degree it becomes necessary to plug back to where the deviation commences and straighten the hole by starting at that point.

In general, apparatus embodying my invention comprises a casing which contains means and apparatus for making the survey and which may be passed throughout the length of the drill hole with its axis in substantially parallel relation to the axis of the drill hole. My apparatus is operated merely by lowering the casing into the drill hole as by a cable fastened to the top thereof.

The casing contains surveying apparatus which consists, generally speaking, of a movable tape, a term covering any type of sheet, and means for making a record thereon which indicates the vertical and/or horizontal orientation of the drill hole. The recording means may comprise a plumb swinging as a pendulum, which, together with a flat tape, is mounted on a rotatable frame so as to record the vertical angle of dip of the axis of the drill hole. It may comprise a plumb swingingly mounted on a circular track so as to record on a cylindrical tape the direction of displacement of the axis of the drill hole. The recording means may also comprise a gyroscope arrangement to record on cylindrical tape the horizontal angular displacement or twisting of the casing. It also may comprise a compound plumb arrangement mounted on gimbals which records on cylindrical tape both direction and degree of orientation of the axis of the drill hole. The description of these recording means and the manner in which they can be used and combined in my apparatus will be described in detail hereinafter as will also other objects, novel features and advantages of my invention.

It will facilitate a description of my invention to make reference to the accompanying drawings.

Figures 1 to 5 embody my invention in a simple form comprising a plumb swinging as a pendulum with a stylus which is mounted together with a flat tape on a swinging frame so as to record vertical angular displacement of the axis of the drill hole at any particular point in the descent of the surveying apparatus. In these drawings, Figure 1 is a vertical sectional view;

Fig. 2 is a longitudinal sectional view taken on the line 2—2 of Fig. 1;

Fig. 3 is a horizontal sectional view taken on the line 3—3 of Fig. 1;

Fig. 4 is a detailed sectional view of the driving means; and

Fig. 5 is a detailed sectional view of the spindle casing.

Figs. 6 to 11 represent a plumb swingingly mounted on a circular track with stylus to record the direction of displacement of the axis of the drill hole. In this form of my apparatus, the record is made on a cylindrical tape composed of two tapes moving coordinately between the opposing surfaces of concentric forming cylinders. These drawings also disclose a gyroscope and stylus arrangement to record the horizontal angular displacement or twisting of the casing in the cylindrical tapes above mentioned. In these drawings, Fig. 6 is a vertical sectional view;

Fig. 7 is a longitudinal sectional view taken on the line 7—7 of Fig. 6;

Fig. 8 is a horizontal sectional view taken on the line 8—8 of Fig. 6;

Fig. 9 is a detailed perspective view of the gyroscope arrangement; and

Figs. 10 and 11 are cross-sectional views of two alternative forms of lower joints for the gyroscope.

Figs. 12 to 17 embody my apparatus with driving means located at the bottom of an outer casing and with a separate and removable inner casing. The gyroscope and tape arrangement is similar to that appearing in Figs. 6 to 11 supra. There is disclosed further a compound plumb arrangement which records on the cylindrical tape both degree and direction of the vertical angle of dip of the axis of the drill hole. In these drawings, Fig. 12 is a vertical sectional view;

Fig. 13 is a longitudinal sectional view taken on the line 13—13 of Fig. 12;

Fig. 14 is a detailed perspective view of the compound plumb arrangement;

Fig. 15 is an enlarged sectional view of the tape-driving mechanism taken on the line 15—15 of Fig. 12;

Fig. 16 is an enlarged sectional view of the driving mechanism taken on the line 16—16 of Fig. 13; and Fig. 17 is a detailed sectional view taken on the line 17—17 of Fig. 13.

A sample record on the tape produced by apparatus illustrated in Figs. 12—17 inclusive is shown in Fig. 18.

Referring to Figs. 1 to 5, 1 is a cylindrical casing enclosed at both ends which contains the surveying apparatus and which may be made of some metal, the walls being thick enough to withstand the pressure of fluids (e. g., water or oil) of great depths such as three or four thousand feet. The casing may be fitted with a door (not shown) in order to permit entrance into the interior of the casing to change the recording roll, adjust mechanism, etc. At the top of the casing is fastened an eye, 4, to which may be attached a drilling cable or other rope for lowering the apparatus into the drill hole.

Adjacent to the top and bottom of the casing 1 are situated contact wheels or rollers 5, 5 mounted in recesses 6 along the same element of the casing and on the short shafts 9 so as to protrude slightly above the surface of the cylinder and provide rolling contact with the side wall of the drill hole as the casing is passed therethrough.

Mounted on the casing opposite the rollers 5, 5 are wheels or rollers 10, 10 adjacent the top of the casing and corresponding rollers 11, 11 adjacent the bottom. Between rollers 10 and 11, I prefer to use caterpillar treads made of rubber with suction cups and which are adapted with appropriate cavities to engage spikes on the rims of the wheels 10, 10 and 11, 11 and cause said wheels to rotate. The use of caterpillar treads, while not essential to my invention, is desirable to insure firm contact with the side wall of the drill hole.

In order to procure firm traction on the side wall of drill holes and to allow the use of one apparatus in holes of different diameter, wheels 10, 10 and 11, 11 are yieldably mounted in recesses 14, 14 in the casing. To accomplish this, wheels 10, 10 and 11, 11 are mounted on short shafts respectively 18a and 18, that are attached to bars 19, 19 which in turn telescope into tubes 20, 20 and against coiled springs 21 at the end of the said tubes. The wheels 10, 10 and 11, 11 and caterpillar treads 12 thereon are thereby maintained in firm but yielding contact with the side wall of the drill hole as mentioned above.

Suitable mechanism may be used to prevent the wheels from winding backward when the apparatus is being withdrawn from the drill hole.

The power from wheels 11, 11 on shaft 18 is transmitted into the interior of the casing and to the recording apparatus therein by fixing to shaft 18 sprocket wheel 22 and passing sprocket chain 23 over said sprocket wheel and sprocket wheel 24 fixed to shaft 25. Shaft 25 is journaled loosely at the end of bar 26. The opposite end of bar 26 is mounted loosely on shaft 18. Fixed to shaft 25 is sprocket wheel 27 over which is passed sprocket chain 28 which leads to sprocket wheel 29 mounted on shaft 30. Sprocket wheels 27 and 29 are at the opposite ends of bar 31 which is loosely journaled on shafts 25 and 30. Shaft 30 turns bevel gears 32 and 33, the latter being fixed to rod 34 which passes into the interior of the casing through bushing 35 and is supported by supporting bracket 36 and terminates in crown gear 37.

The system of sprocket gears and bars above described enables wheel 11, 11 to transmit power to the interior of the apparatus in a manner which is unaffected by different degrees of extension of the telescoping bars 19, 19 on which the wheels 10, 10 and 11, 11 are mounted. While the above-described means of transmitting power to the interior of the apparatus is preferable, other means may be employed to accomplish a similar result such as a flexible cable or a flexible belt either with or without a tension idler.

In the interior of the apparatus is a cylindrical frame 38 of light construction which contains the movable recording tape 39 and plumb 40 and which is mounted to swing freely around an axis parallel to the sides of the outer casing by means of rod 41 pivoted at the top and bottom of the outer casing at pivots 42 and 43. The casing 38 is fixed to rod 41 at 44 and journaled loosely about hollow shaft 45 at 46. Casing 38 is provided with a door (not shown) to enable adjustment and repair of the apparatus contained therein. While the above construction is preferable, other means for obtaining the free revolution of the interior frame 38 may be employed such as bearings about a fixed central shaft, or by equipping the outer casing on the inside thereof with rings to act as tracks for wheels fixed to the rotatable inner frame.

The recording tape is wound on tape roll 47 from tape roll 48 as the apparatus descends into the drill hole. Power is transmitted to the tape roll 47 and geared down as follows. Crown gear 37, transmission of power to which has heretofore been described, meshes with gear 49 which is fixed to hollow shaft 45. The hollow shaft 45 is journaled loosely on rod 41 and is prevented from slipping longitudinally thereon by stops 50 and 51 affixed to rod 41 which are equipped with ball bearings 50a and 51a. Also fixed to hollow shaft 45 is sprocket wheel 52 connected by sprocket chain 53 to sprocket wheel 54 fixed to rod 55. Rod 55 is supported by setting 56 and bracket 57 and has worm gear 58 affixed thereto. Worm gear 58 meshes with worm wheel 59 mounted on shaft 60 which in turn is supported by brackets 61. Affixed to shaft 60 is sprocket wheel 62 connected by sprocket chain 63 to sprocket wheel 64 on shaft 65 which in turn is supported by brackets 66 and 67. Worm gear 68 fixed to shaft 65 meshes with worm wheel 69 which is affixed to paper roll 47 and turns it slowly as the apparatus passes into the drill hole. By this arrangement of gearing, the traction of the apparatus in being lowered into the drill hole preferably rotates the tape roll so that the tape will move approximately one inch for every five hundred feet of penetration of the apparatus into the hole. Any other convenient scale may, however, be used. It is thus seen that means are afforded whereby the movement of the recording tape bears a definite relation to and is a function of the degree of penetration of the surveying apparatus into the drill hole. Whenever a recording tape is moved in a known relation (or approximately so) to the penetration of the surveying apparatus into the drill hole, the movement of the tape is to be considered as "functional" in relation to the movement of the surveying apparatus. This functional movement may be achieved not only by mechanical connection from the exterior to the interior of the apparatus but also by timing the speed at which the apparatus is lowered in accordance with a predetermined speed of recording mechanism actuated from within the apparatus.

Plumb 40 is swingingly mounted on short shaft 70 attached to bracket 71 and has affixed to the upper end thereof the stylus 72 adapted to make a mark on the tape 39. A weight 73 is placed in casing 38 so that when the apparatus tips with the axis of the drill hole, the pivoted casing 38 will swing. The weight is placed perpendicularly to rod 70 on which the plumb 40 is mounted, so that the plumb will swing as a pendulum and therefore remain vertical at all times. When the axis of the apparatus is tipped from the vertical in the course of its passage through the drill hole, the plumb and stylus will swing in an arc and cause a record to be made on the tape. The distance that the stylus moves from its position when the apparatus is vertical shows the vertical angle of dip of the axis of the drill hole at that particular point. The tape, of course, may be calibrated according to the number of feet that the apparatus has penetrated into the drill hole, in order to facilitate the making of the readings. When the apparatus is vertical the calibrated tape is preferably set so that the stylus will give a true reading, the stylus tracing a line down the center of the tape. When the apparatus is inclined from the vertical, a correction may be made to allow for the fact that the stylus swings in an arc about its pivot and therefore makes a record somewhat above the tape calibrations. While the correction will be practically negligible for small angles, a correction can be made, if desired, at a particular point by describing an arc from said point to the center of the tape with radius equal to the distance of the stylus from its pivot and with its center on the center line of the tape. The position of the arc on the center line of the tape will give the true reading.

While the above apparatus affords means for determining the degree of vertical angle of dip of the axis of a drill hole at any particular point, it does not afford means for determining the direction of the angle, i. e., whether it is north, south, east or west. In order to determine directional orientation of the axis of the drill hole, means shown in Figs. 6 to 11 may be employed. In this form of apparatus, there is no pivoted and swingable interior casing, but there is an interior casing 74 that is rigidly fixed to the outer casing and provided with a door (not shown) providing access to the apparatus in the interior thereof.

There are two tapes 75 and 76, wound from the tape rolls 77 and 78, which are caused to pass between concentric cylinders 79 and 80 to give the tapes the form of a cylinder, and are wound on a common tape roll 81 so as to insure their substantially equal movement.

The outer concentric cylinder 79 is held in position by brackets 82, 83 and 84 fixed to casing 74. The inner concentric cylinder 80 is fastened to the outer concentric cylinder 79 along two opposite elements thereof by solder or brazing at 85 and 86 and separated from outer cylinder by an aperture sufficiently wide to admit the passage of the paper tapes therethrough. The two tapes, therefore, will not come in contact so as to make a perfect cylinder of paper but will be separated by the solder or brazing to the extent of about one-eighth of an inch by the substantially diametrically opposed joining elements. The two tapes will therefore come substantially into contact in the form of half cylinders about an axis, which is longitudinal with respect to the length of the tapes. When reference is made to the use of a cylindrical recording tape, it is not essential that the tape describe a complete cylinder. In this connection each of the tapes, in so far as they make up a part of a cylinder, may be referred to as cylindrical. This will not interfere, however, with the making of an accurate record.

Affixed to the center of the top of cylinder 80 by swivel joint 87 is plumb 88 equipped with roller 89 that rolls on circular track 90. At the end of the plumb is stylus 91 which causes a record to be made on the tapes 75 and 76 through gap 92 made in cylinder 80. The stylus and plumb are arranged so that when the axis of the apparatus is vertical, a very light impression will be made on the tape. When the axis of the apparatus is tipped from the vertical, the plumb will swing and the weight of the plumb will cause a heavier line to be recorded. It is apparent that the plumb will swing in a direction away from the direction of inclination of the axis of the drill hole and that the record made by the stylus will give directly the direction of inclination of the drill hole.

To determine the horizontal angular displacement of the casing due to twisting the casing as it descends and to ascertain the true north at all points, I provide a gyroscope or gyroscopic compass. I have shown in Figs. 6 to 11 a gyroscope which is maintained in rapid revolution by compressed air. The gyroscope is mounted on gimbals and is placed between two pivots 93 and 94 situated along the axis of cylinder 80, the top pivot 93 being in the center of partition 95 in cylinder 80 and the lower pivot 94 being in the center of the bottom of said cylinder. The gyroscope consists of circular frame 96 pivoted at pivots 93 and 94 above mentioned and another circular frame 97 pivoted on frame 96 at pivots 98 and 99 situated 90° from pivots 93 and 94. On frame 97 at 90° from pivots 98 and 99 are pivots 100 and 101 which support the rotatable rod 102 in the center of which is mounted the inertia wheel 103 of the gyroscope. Means (not shown) may also be provided for adjusting the inertia wheel of the gyroscope so as to be in perfect balance. At either of the pivots 98 or 99, a stylus 104 may be attached (here shown attached to pivot 99) to make a record on tapes 75 and 76 through a gap 105 in cylinder 80. The above arrangement on gimbals enables the inertia wheel of the gyroscope to remain in a true vertical position during its continued rotation and will record the horizontal angular deflection of the casing at all points in the descent of the surveying apparatus through the drill hole.

The inertia wheel of the gyroscope may be maintained in revolution by compressed air introduced through a nozzle 106 placed in operative relation with flutings 107 located at the periphery of the inertia wheel 103. I may arrange nozzle 106 in relation to pivot 94 as shown in Fig. 10. The current of air is introduced through a fixed pipe 108 which terminates in a slight bell 109. The nozzle is fixed to a casing 110 which surrounds the bell 109 leaving sufficient clearance to permit the insertion of the bell therein. Casing 110 is fixed to the gyroscope frame 96. The friction of the pivot is taken up by ball bearings 111 which are held in place by the circular retaining wall 112.

A preferred way of arranging the nozzle and pivot is shown in Fig. 11. The pipe 108 through which the air is introduced is in this case somewhat larger and has across it a base 113 for a pivot held in place by a spider which leaves as wide spaces as possible for the passage of air thereby. The casing 114 surrounds the terminus of pipe 108 and has within it a spider 115 to which is attached pivot 116.

Any source of compressed air may be used to operate the gyroscope. I prefer to use, and have shown in the drawings, a rotary fan 117, any common type of fan being suitable. The stationary casing of the fan is held in place by bracket 118 and is connected with the pipe 108, which introduces the air to the gyroscope, by a chamber 119 having a conical contraction leading into pipe 108 which tends to compress and drive the air from the fan into pipe 108. The rotary blades of the fan are mounted on the spindle 120. Gear 121 also on spindle 120 is driven to operate the fan, from power shaft 122 by means of a series of gears 123, 124, 125, 126, and 127 which step up the speed so as to give the rotating fan blades sufficient speed.

While specific mechanism has been described for rotating the inertia wheel of the gyroscope, it is to be understood that this has been done for purposes of illustration merely, and that other means can also be used for rotating the inertia wheel of the gyroscope in surveying apparatus embodying this invention.

Besides compressed air, other means may be employed to maintain the motion of the inertia wheel of the gyroscope. For example, it may be motivated by electricity by making the inertia wheel the armature of a small motor, the necessary current being passed to it by the two pivots which, in that case, would be insulated from each other. As a source of electric current, a dynamo could be used driven by means similar to that above described for driving the fan. Batteries could also be used.

The tape roll 81 is driven by the following means. There is attached to power shaft 122 bevel gear 128, which meshes with bevel gear 129 on short shaft 130. Shaft 130 has affixed thereto worm gear 131 and is supported by a bracket (not shown). Worm gear 131 drives worm wheel 132 fixed to shaft 133 mounted on bracket 134. A sprocket chain 135 connects sprocket wheel 136 fixed to shaft 132 with sprocket wheel 137 fixed on the tape roll 81. By this arrangement, the speed of the power shaft 122 is preferably geared down so that the paper roll will move only an inch or so with every five hundred feet of descent into the drill hole.

The gyroscope mechanism above described gives the true north of the casing at all points despite any twisting of the casing and permits correction to be made for twisting of the casing. The difference between the line traced by the swinging plumb on the circular track and the line traced by the gyroscope will give the correct direction of the angle of deviation of the axis of the drill hole.

While a compass could be utilized to give the true north and to correct for twisting of the casing, its readings would be inaccurate in the vicinity of mineral deposits having magnetic property. I therefore regard the use of the gyroscope as much preferable to the use of a compass.

Figs. 12–17 illustrate my apparatus and comprise the gyroscope arrangement hereinabove described in connection with Figs. 6–11, and a compound pendulum arrangement whereby the orientation of the drill hole at any point may be determined both as to degree and direction.

In this case, the outer casing is 138 and the inner casing is 139 and they are so arranged that the inner casing may be lifted bodily from the outer casing. The inner casing 139 is in reality a frame, being two wall plates with a base and a top and strips to brace the walls. It is open so that adjustment and repairs may be made. The top of the inner casing fits into groove 140 at the top of the outer case, which is fitted with a rubber washer or other material to produce a watertight joint.

The method of securing contact with the side wall of the drill hole and transmitting power to the interior here shown is as follows. Contact is made with wheel 141 on shaft 142 journaled in bracket 143. Power is transmitted directly through bevel gears 144 and 145 to spindle 146 and worm gear 147 fixed thereon. Worm gear 147 meshes with worm wheel 148 on shaft 149 which passes through bushing 150 in the outer casing and terminates on the other side thereof in a female coupler 151.

Fastened to the bottom of the inner casing 139 is male coupler 152 corresponding to 151 and adapted to be in operative connection therewith when the inner casing is fastened in place in the outer casing but which permits the inner casing to be readily removed and taken out of the outer casing. The male coupler 152 is held in place by hollow stud 153 which is fastened to the bottom of the inner casing 139. Male coupler 152 has extending from the top thereof a trough 154 forming the travel of ball bearings 155 which gives rolling contact between said trough and hollow stud 153. Fixed to the top of male member 152 is crown gear 156 which meshes with gear 157 keyed to the power shaft 158 from which power is taken for the operation of the various parts of the apparatus.

Yielding contact with the side wall of the drill hole may be maintained in the following way which is an alternative preferred form to that which has heretofore been described in connection with Figs. 1–4. Corresponding to contact wheel 141, from which power is taken, and at the top of the outer casing, is an idling wheel 159 on shaft 160 which is journaled loosely in bracket 161.

To allow for varying diameters of drill holes and to secure a constantly firm contact with the walls thereof, I employ opposite to wheels 141 and 159 two pairs of idling wheels 162 and 163 which idle loosely at the ends of bars 164 and 165. Bars 164 and 165 are fulcrumed at brackets 166 and 167 and at the outer ends thereof tension springs 168 and 169 are fastened which by their tension cause wheels 162 and 163 to swing outwardly and maintain firm but yielding contact with the walls of the drill hole.

The recording tape is similar to that which is shown in Figs. 6 to 11 and has heretofore been described. The tape is taken from tape rolls 170 and 171 and formed into a cylinder by being passed between concentric cylinders 172 and 173. It is wound on common cylinder 174. Power is given to cylinder 174 as follows. Power shaft 158 has fixed thereto gear 175 which meshes with gear 176 on shaft 177. Through bevel gears 178 and 179 and worm gear 180 on countershaft 181, worm wheel 182, fixed on shaft 183, is actuated as is also sprocket wheel 184. Sprocket chain 185 connects sprocket wheels 184 and 186, the latter being fixed to tape roll 174.

The rotor of fan 187 is given power through the following speeding-up mechanism. Gear 188 on power shaft 158 meshes with small spur 189 which is fixed to the same counter shaft as large gear 190, the latter meshing with small gear 191 on shaft 192 on which the rotor of the fan is mounted.

The fan 187 compresses air which is concentrated in chamber 193 and causes the inertia wheel of gyroscope 194 to rotate. The record of horizontal angular displacement of the casing is recorded by stylus 195. The construction of the gyroscope and the manner of its operation are similar to that described in connection with Figs. 6 to 11.

In the form of apparatus illustrated, I employ a compound pendulum apparatus which gives not only the direction of inclination of the drill hole but the amount thereof. The compound plumb arrangement is mounted on gimbals and comprises an outer frame 196 and an inner frame 197. The outer frame is pivoted at 198 and 199 respectively at the center of the top and partition in concentric cylinder 173. The inner frame is mounted at right angles to the outer frame and pivoted from the sides thereof at 200 and 201. The outer frame on one side thereof has a weight 202 which, as the axis of the drill hole tips away from the vertical, causes the outer frame to swing on pivots 198 and 199. On the axis of the inner frame is placed a stylus 203 oppositely situated to the weight 202 on the outer frame. However, as the inner frame also swings on pivots 200 and 201, with the center of gravity below said pivot, so as to remain in a vertical position, stylus 203 will swing away from the recording tape when the axis of the drill hole inclines from the vertical. To compensate for this and to allow the stylus to make a continuous line on the recording tape, I make the nib on the end thereof extensible and place a spring 204 behind said nib and between it and the frame 197 so as to maintain the nib yieldably in contact with the recording tape. The stylus will thus trace continuously the direction of inclination of the axis of the drill hole at all points.

To record the degree of inclination at particular points in the descent of the apparatus into the drill hole, I have an intermittent stylus 205 in close proximity to stylus 203 and at like distance from the top and bottom of the inner frame 197. The intermittent motion of stylus 205 at predetermined intervals is accomplished in the following manner. On power shaft 158 is mounted sprocket wheel 206 which by sprocket chain 207 is connected to sprocket wheel 208 on shaft 209. Bevel gear 210 on shaft 209 meshes with bevel gear 211 on hollow shaft 212 which is journaled loosely on spindle 213. On hollow shaft 212 is large gear 214 which meshes with small gear 215 mounted on shaft 216 which is journalled loosely in frame 196. Shaft 216 is connected by flexible cable 217 to worm gear 218 on frame 197 which meshes with worm wheel 219 on rod 220 which is mounted loosely in bearings 221 and 222 in frame 197. Affixed to worm wheel 219 is cam plate 223. Stylus 205 is mounted on rod 224 which is journaled in bushing 225. At one end of rod 224 is roller 226 maintained yieldably in contact with cam plate 223 by extension spring 227 located between bushing 225 and a small stop plate on rod 224. In order to allow for different degrees of extension of rod 229 required in making a record on the recording tapes at different degrees of inclination of the axis of the drill hole, the nib on stylus 205 is mounted extensibly by spring 228 on rod 224. The mechanism is arranged so that when the roller 226 is in a recess of cam plate 223, the rod will be so far withdrawn by the action of spring 227 as to cause stylus 205 to be entirely withdrawn from the recording tape. However, when the roller reaches an elevation on the cam plate the stylus will be so extended as to place a mark or dot on the recording tape.

An alternative method of producing an intermittent record by stylus 205 is to actuate stylus 205 by electrical means such as an electro-magnet. In such case the mechanical means comprising worm wheel 219, rod 220, cam plate 223, roller 226, worm gear 218, flexible cable 217, shaft 216, gears 215, 214, 211, and 210 and hollow shaft 212 would be eliminated. The stylus 205 could be mounted on rod 224 as heretofore described only the interior termination of rod 224 could be hooked so that the energizing of an electromagnet adjacent to the end thereof would cause the rod 224 and stylus 205 to move toward the recording tape and make a record thereon. Upon deenergizing the electromagnet spring 227 would immediately cause rod 224 to assume its normal position carrying stylus 205 away from the recording tape. A bracket on frame 197 may be used to hold the electro-magnet in position. Current for energizing the electro-magnet may be supplied by batteries, or if a dynamo is used instead of a fan as heretofore described as affording means for supplying power to the inertia wheel of the gyroscope, current generated by the dynamo could be used to energize the electro-magnet. Current may be carried to the electromagnet through pivots 198 and 199, the sides of frame 196 being composed of an insulating material to prevent short circuiting. Light coils of wire from the top and bottom of frame 196 may be used to carry current to the electro-magnet, thus leaving frame 197 substantially free to swing. The making and breaking of the current at predetermined intervals may be accomplished by any suitable means such as a contact wheel fastened to rod 209 in place of bevel gear 210. By making the contact wheel of insulating material with small portions of conducting material therein, and providing a brush to make contact with the contact wheel, making and breaking of the current, at predetermined intervals, may be accomplished as desired. By employing the above described electrical means of producing intermittent contact of stylus 205 with the recording tape, a very sharp and distinct dot can be made in the recording tape. This method also eliminates frictional resistance of the mechanical means first described for accomplishing this same result.

Stylus 205 can be arranged to make a mark at any predetermined point, such as, for example, every five hundred feet during the descent of the apparatus into the drill hole. When the apparatus is thus set and is in a vertical position, the stylus 205 will make a mark on the recording tape at each interval of five hundred feet of descent, the mark to come directly upon the corresponding calibrations on the tape. When, however, there is an inclination of the axis of the drill hole, inner frame 197 will swing so as to remain vertical and stylus 205 will make a mark somewhat above the mark which it would have made if the apparatus had been vertical and above the calibrations on the tape. It is apparent that the amount that the mark is above the place where it would have been if the axis of the drill hole had been vertical is a function of the degree of inclination of the axis of the drill hole and that the degree of inclination can be calculated therefrom.

A sample of a record which would be made by apparatus embodying my invention in the form last above described is shown in Fig. 18. The record may be interpreted as follows. The continuous line there appearing indicates the record made by the stylus on the gyroscope and gives the true north at all points. The record in Fig. 18 shows that the casing was twisted very little during the first nine hundred feet of descent, but that it subsequently became twisted to a considerable extent. As the recording tape is so adjusted that the zero reading thereon will be opposite styluses 203 and 205 when the apparatus is in a vertical position, the stylus on the gyroscope, being spaced at a distance from the styluses 203 and 205, will cause a record to be made which is approximately two hundred feet ahead according to the calibrations on the tape. It is a simple matter to determine by experiment exactly how far its record is in advance according to the calibrations. To determine the true reading, therefore, the record traced on the tape by the stylus of the gyroscope must be projected upward by an amount corresponding to the space between the gyroscope stylus and styluses 203 and 205.

The spaced line, Fig. 18, is that traced by stylus 203 on frame 197. The tape is adjusted so that when the apparatus is in a vertical position, stylus 203 will fall directly upon the calibration corresponding to the true distance of travel into the drill hole. However, when the axis of the drill hole is inclined from the vertical, the record at a certain depth will be somewhat above that indicated by the calibrations on the recording tape and a correction must be made. The correction can be ascertained by noting the position of the marks left by the intermittent stylus 205. For example, we know that the third dot from top of the record made by stylus 205 was made after the apparatus had descended fifteen hundred feet into the drill hole. That its record is somewhat above the fifteen hundred feet calibration on the tape is due to the fact that the axis of the drill hole was inclined from the vertical at that point. As styluses 205 and 203 are similarly placed, the correction to be applied to the line traced by 203 corresponds to the distance that the dot recorded by 205 is above the fifteen hundred feet calibration. For points adjacent thereto, a like correction can be made.

After the line traced by stylus 203 has been corrected, the direction of inclination can be calculated by noting its distance from the line traced by the gyroscope. Thus in Fig. 18, the reading of the spaced line at 1500, as corrected, is found to be 56° west of the line traced by the gyroscope after that line has been projected so as to allow for the spacing of the gyroscope stylus below the stylus 203. As the gyroscope registers north, the reading is therefore 56° west of north at a depth of 1,500 feet. This is the direction in which the drill hole inclines from the vertical. It will be noted in Fig.

18 that east is to the left of north at the top of the recording tape. This is because the stylus on the compound pendulum points away from the direction of the vertical angle of dip of the drill hole.

The vertical angle of dip can be calculated immediately by noting the positions of the dots made by the intermittent stylus 205. The fraction of an inch that the dot is above the point at which it would be if the hole were vertical, divided by the horizontal distance in inches from the axis between pivots 200 and 201 to the record tape (a constant for the apparatus, for example, 1.5 inches) gives the tangent of the vertical angle of dip. For example, in Fig. 18 at 2,000 feet the dot is .15 inch above the 2,000 feet mark on the tape.

$$\frac{.15}{1.5}$$

equals the tangent of the angle of dip which is 5° 45'. This is the vertical angle of dip in degrees. The closer together dots made by stylus 205 can be made the more accurate and reliable will be the readings, but for mechanical reasons the dots cannot be spaced closer than one for every one hundred feet. Greater frequency of the dots is, however, not necessary, as it is substantially impossible for apparatus for drilling drill holes to make sudden changes in direction within one hundred feet. The average deviation between two adjoining dots will give the deviation at intermediate points with sufficient accuracy.

In practical operation, it will be found convenient to have the record traced by the gyroscope stylus of a different color from those traced by styluses 203 and 205. The making of readings from the record tape can be facilitated by the construction of a measure calibrated in degrees of inclination from which readings in degrees can be obtained directly merely by laying the measure on the record.

The surveying means which I have described and illustrated in the foregoing do not necessarily have to be made in exactly the manner set forth. For example, the simple plumb with flat tape arrangement on a rotatable frame may not only be used alone but also may be combined with the swinging plumb on a circular track and cylindrical tape, so that the apparatus may record both degree and direction of inclination. These two arrangements may be further combined with the gyroscope to correct for twisting of the casing. It is also possible to provide two flat tapes at right angles to each other in fixed relation to the casing and with pendulum plumbs in order to record both degree and direction of deviation from the vertical. I obviate this latter rather complicated means, however, by the compound plumb arrangement with cylindrical tape illustrated in Figs. 12 to 17, which accomplishes the same result and is more readily adaptable for use in connection with the gyroscope.

While means for supplying power to the interior of the surveying apparatus has been described in connection with a power wheel on the outside of the apparatus which is maintained frictionally in contact with the sides of the drill hole in which the apparatus is lowered, it is to be understood that this has been done for the purpose of illustration merely and that other means for supplying power to the mechanism on the interior of the surveying apparatus to move the parts thereof as heretofore described may be employed according to this invention. For example, power may be supplied to the mechanism on the interior of the apparatus by means of a friction wheel maintained frictionally in contact with a cable lowered from the surface or by means of power generated within the apparatus.

In the foregoing description, I have described the rotation of the tape rolls by transmitting power from the contact wheels to the said rolls. An alternative method of actuating the tape rolls is to employ clockwork. If clockwork is employed, it must, of course, be synchronized with the rate of descent of the apparatus with the drill hole. The use of clockwork to actuate the tapes with a tank of compressed air to rotate the gyroscope would eliminate the necessity of deriving power from contact with the side wall of the drill hole, and the mechanism for transmitting the power so derived into the interior of the apparatus.

In using surveying apparatus embodying my invention, the apparatus is merely lowered into the drill hole by means of a cable. The apparatus may then be withdrawn and the record examined.

The cable for lowering the apparatus into the drill hole may be fastened to the apparatus by means of an eye 2 on the top of the apparatus as shown in Figs. 1 and 2. An ordinary bail may also be used and it is also possible to employ a threaded socket which is made to engage corresponding threads at the top of the casing. If a tank of compressed air is used to operate the gyroscope and is fastened to the top of the surveying apparatus, the cable may be attached to the top of the tank.

While I have in the foregoing given specific descriptions of apparatus embodying my invention, I do not wish thereby to limit the scope of my invention but desire it to be understood that such specific descriptions are merely illustrative.

I claim:

1. Apparatus for surveying drill holes comprising a swingable plumb, means to guide circularly the motion of said plumb, a longitudinally movable tape shaped substantially cylindrically about an axis which is longitudinally with respect to the length of said tape, and means for recording the position of the plumb on said recording tape.

2. In apparatus for surveying drill holes the combination comprising a roll of plane recording tape from which the tape may be unwound, a second roll upon which said tape may be wound, means intermediate between said rolls for shaping the tape to correspond with the periphery of a cylinder parallel to the length of said tape, and means for moving the tape from one roll to the other.

3. In apparatus for surveying drill holes having a gyroscope adapted to make a record on recording means relatively movable with respect thereto, the combination comprising a casing, a traction wheel on the exterior of said casing, means on the interior thereof for compressing air by power transmitted from said traction wheel, and means for rotating the inertia wheel of the gyroscope by air so compressed.

4. Apparatus for surveying drill holes comprising a casing having substantially parallel sides, a compound plumb mounted on gimbals, the outside frame being rotatable about an axis parallel to the sides of the casing and having the center of gravity thereof to one side of its axis and the inside frame being rotatable about an axis at right angles to the axis of the outer frame and having its center of gravity below its axis, a stylus mounted on the inner frame, means for maintaining the stylus in contact with the cylindrical recording tape, another stylus also mounted on the inner frame, and means for bringing the latter stylus into intermittent contact with the cylindrical tape at predetermined intervals of penetration of the apparatus into the drill hole.

5. In apparatus for surveying drill holes having a casing, a rotatable frame mounted in said casing and a movable recording tape mounted on rolls supported by said frame, the combination comprising a power wheel mounted on said casing which is movable substantially functionally in relation to the degree of penetration of the apparatus into the drill hole, means for transmitting motion of said power wheel to said rolls, and means for maintaining substantially functional relationship between the movement of said wheel and of said rolls.

6. In apparatus for surveying drill holes having a movable recording tape, means for moving said tape substantially functionally in relation to the degree of penetration of the apparatus into a drill hole, and a plumb adapted to make the record on said tape, the combination comprising a casing having substantially parallel sides, means for maintaining said tape in the form of a cylinder having sides parallel to the sides of the casing, means for directing the movement of said tape lengthwise of said cylinder, means for mounting said plumb in the center of said cylindrical recording tape, and means to guide circularly the motion of said plumb, the circular motion of said plumb being recorded on said cylindrical recording tape.

7. In apparatus for surveying drill holes having a recording tape, means for moving said recording tape and recording means adapted to make a record on said recording tape, the combination comprising two adjacent concentric cylinders, means for directing the movement of said tape between said concentric cylinders along the length thereof, means for swinging said recording means about the axis of said concentric cylinders, and means for contacting said recording means with said recording tape.

8. In apparatus for surveying drill holes having a recording tape, means for moving said recording tape functionally in relation to the degree of penetration of the apparatus into the drill hole, a gyroscope adapted to make a record of its position on said recording tape, and means for rotating the inertia wheel of said gyroscope, the combination comprising a casing having substantially parallel sides, means for maintaining said tape in the form of a cylinder having sides parallel to the sides of the casing, means for directing the movment of said recording tape lengthwise of said cylinder, mounting means for said gyroscope rendering said gyroscope rotatable about the axis of the tape cylinder, a stylus on said gyroscope rotatable about the axis of said tape cylinder, and means for recording the position of the stylus on said recording tape cylinder.

9. In apparatus for surveying drill holes having a recording tape, means for moving said recording tape substantially functionally in relation to the degree of penetration of the apparatus into the drill hole, and a gyroscope adapted to make a record of its position on said recording tape, the combination comprising a casing for said apparatus, a traction wheel on the exterior thereof, and means for rotating the inertia wheel of the gyroscope by power transmitted from said traction wheel.

10. In apparatus for surveying drill holes having a plumbing means adapted to make a record on a recording tape and means for moving said tape lengthwise of said tape and substantially functionally in relation to the degree of penetration of the apparatus into the drill hole, the combination comprising means for shaping said tape to correspond with the periphery of a cylinder, said tape being movable lengthwise with respect to the axis of said cylinder, a compound plumb mounted on gimbals, the outer frame thereof being rotatable about the axis of the tape cylinder, a stylus on the inner frame of said gimbal, and means for maintaining said stylus in contact with said cylindrical tape.

11. In apparatus for surveying drill holes having a plumbing means adapted to make a record on a recording tape and means for moving said tape lengthwise of said tape and substantially functionally in relation to the degree of penetration of the apparatus into the drill hole, the combination comprising means for shaping said tape to correspond with the periphery of a cylinder, said tape being movable lengthwise with respect to the axis of said cylinder, a compound plumb mounted on gimbals, the outer frame thereof being rotatable about the axis of the tape cylinder, a stylus on the inner frame of said gimbal, and means for bringing said stylus into intermittent contact with the cylindrical tape at predetermined intervals of penetration of the apparatus into the drill hole.

12. In apparatus for surveying drill holes having substantially parallel sides, a plumb and gyroscope adapted to make a record upon a recording tape, and means for moving said tape lengthwise of said tape and substantially functionally in relation to the degree of penetration of the apparatus into the drill hole, the combination comprising means for shaping said tape to correspond with the periphery of a cylinder having its axis substantially parallel to the sides of the casing, said tape being movable lengthwise with respect to the axis of said cylinder, a compound plum mounted on gimbals with its outside frame rotatable about the axis of the tape cylinder and having its center of gravity to one side of its axis and with the inside frame thereof rotatable about an axis at right angles to the axis of the outer frame and having its center of gravity below its axis, a stylus mounted on the inner frame, means for maintaining the stylus in contact with the cylindrical recording tape, another stylus also mounted on the inner frame, means for bringing the latter stylus into intermittent contact with the cylindrical recording tape at predetermined intervals of penetration of the apparatus into the drill hole, means rendering said gyroscope rotatable about the axis of the cylindrical recording tape, means for rotating the inertia wheel of the gyroscope, and a stylus on said gyroscope rotatable about the axis of the cylindrical recording tape and in contact with said recording tape.

13. In apparatus for surveying drill holes having a casing, a movable recording tape, and means for moving said tape functionally in relation to the degree of penetration of the apparatus into the drill hole, the combination comprising means for shaping said tape cylindrically lengthwise of said tape and for causing said tape to move lengthwise with respect to the axis of the cylinder formed by said tape, gravity means for recording the vertical angle of dip of the axis of the apparatus on the recording tape cylinder, gravity means for recording the direction of the vertical angle of dip of the axis of the apparatus on said recording tape cylinder, a gyroscope, and means to record the direction of the gyroscope on said recording tape cylinder.

14. In apparatus for surveying drill holes having a plumb adapted to make a record on a recording sheet and means for moving said sheet, the combination comprising means for shaping said sheet into a cylinder having an axis substantially parallel to the axis of the apparatus, means for directing the movement of said sheet longitudinally with respect to said cylinder and mounting means for rendering said plumb swingable circularly about the axis of said cylinder, said plumb being adapted for recording its position on said cylindrical sheet.

15. An apparatus for surveying drill holes having a plumb adapted to make a record on a recording sheet and means for moving said sheet, the combination comprising means for shaping said sheet into a cylinder having an axis substantially parallel to the axis of the apparatus, means for directing the movement of said sheet longitudinally with respect to said cylinder, and mounting means for rendering said plumb swingable circularly about the axis of said cylinder, said plumb being adapted for recording its position on said cylindrical sheet on the interior thereof.

16. Apparatus for surveying drill holes comprising a casing, a continuous articulated chain member mounted for movement on said apparatus and having a tread portion on the exterior of said casing, means for maintaining said articulated chain throughout a substantial portion thereof yieldably in contact with the side wall of a drill hole in which the apparatus is placed, and means for transmitting power from said articulated chain to the interior of the casing.

In testimony whereof, I have signed my name to this specification.

HENRY ROGATZ.